United States Patent
Sim et al.

(10) Patent No.: US 12,109,913 B2
(45) Date of Patent: Oct. 8, 2024

(54) REGENERATIVE BRAKING SYSTEM USING REFERENCE DECELERATION DURING VEHICLE COASTING DRIVE AND METHOD THEREOF

(71) Applicants: HYUNDAI MOTOR COMPANY, Seoul (KR); KIA CORPORATION, Seoul (KR)

(72) Inventors: Gyu-Bin Sim, Seoul (KR); Kyung-Han Min, Incheon (KR); Seung-Jae Yoo, Hwaseong-si (KR); A-Ram Park, Goyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 339 days.

(21) Appl. No.: 17/409,219

(22) Filed: Aug. 23, 2021

(65) Prior Publication Data
US 2022/0111734 A1  Apr. 14, 2022

(30) Foreign Application Priority Data
Oct. 8, 2020  (KR) .................. 10-2020-0130514

(51) Int. Cl.
*B60L 7/18*  (2006.01)

(52) U.S. Cl.
CPC .......... *B60L 7/18* (2013.01); *B60L 2240/12* (2013.01); *B60L 2240/16* (2013.01); *B60L 2240/68* (2013.01); *B60L 2250/28* (2013.01)

(58) Field of Classification Search
CPC .... B60L 7/18; B60L 2240/12; B60L 2240/16; B60L 2240/68; B60L 2250/28; B60L 15/2009; B60L 2240/423; B60L 2260/24; B60L 3/0015; B60L 7/10; Y02T 10/60; Y02T 10/64; Y02T 10/72; Y02T 10/62; B60W 30/18127; B60W 30/18072; B60W 40/02; B60W 40/105; B60W 2050/0002; B60W 2520/10; B60W 2540/10; B60W 2554/80; B60W 2720/10; B60T 8/321; B60T 2270/60; B60Y 2200/91; B60Y 2200/92; B60Y 2300/18066; B60Y 2300/18125; Y04S 10/126
See application file for complete search history.

(56) References Cited

U.S. PATENT DOCUMENTS

2013/0304344 A1* 11/2013 Abe ................... B60L 15/2009
                                                          701/70
2017/0015203 A1*  1/2017 Oguri ..................... B60L 50/62

* cited by examiner

*Primary Examiner* — Alan D Hutchinson
(74) *Attorney, Agent, or Firm* — Fox Rothschild LLP

(57) ABSTRACT

A regenerative braking system is provided. The regenerative braking system includes: a preceding vehicle recognition module installed in a vehicle, the preceding vehicle recognition module configured to determine whether a preceding vehicle is present and measure information on a relative distance and a relative velocity to the preceding vehicle; a vehicle sensor installed in the vehicle; and a controller configured to receive information generated from the preceding vehicle recognition module and a sensor signal generated form the vehicle sensor; to generate a reference deceleration to maintain a distance from the preceding vehicle within a safety distance; to generate a driving torque command for outputting regenerative braking torque for following the generated reference deceleration; and to transfer the generated driving torque command to a vehicular driving system.

7 Claims, 4 Drawing Sheets

CONSTANT ACCELERATION (CA) MODEL $$a_{CA} = \frac{v_{pre}^2 - v_{ego}^2}{2d_{rel}}$$

CONSTANT TIME GAP (CTG) POLICY $$\delta = hv_{ego} + d_{min} - d_{rel}$$
$$a_{CTG} = -\frac{1}{h}(v_{rel} + \lambda\delta)$$

REGENERATIVE BRAKING SYSTEM USING REFERENCE DECELERATION DURING VEHICLE COASTING DRIVE AND METHOD THEREOF

CROSS-REFERENCE TO RELATED APPLICATION

This application claims priority to and the benefit of Korean Patent Application No. 10-2020-0130514, filed on Oct. 8, 2020, the disclosure of which is incorporated herein by reference in its entirety.

TECHNICAL FIELD

The present disclosure relates to a regenerative braking system,

BACKGROUND

In general, a hybrid electric vehicle (abbreviated as 'HEV') refers to a vehicle that is driven using driving force provided by an engine and a motor and an electric vehicle (abbreviated as 'EV') refers to a vehicle that is driven using the driving force provided by the motor.

In the hybrid electric vehicle or electric vehicle, the driving force is provided by the motor at the time of starting or at a predetermined velocity or less and the driving force is provided by the engine when driving at a constant velocity with high fuel efficiency and a battery applying power to the motor is charged by actuating a generator.

In this case, when a driver does not step on an accelerator and a brake while driving the vehicle, coasting driving in which the vehicle is driven by inertia is performed and a regenerative braking function is actuated during the coasting driving.

In general, the regenerative braking function indicates that when the vehicle performs the coasting driving or the brake pedal is stepped, the power supplied to the motor is interrupted, but counter electromotive force is generated from the motor by a wheel rotated by progress inertia of the vehicle and the counter electromotive force is applied to the motor again, regenerative braking torque for generating reverse torque is generated in the motor to generate braking force of the vehicle.

Since an additional fuel efficiency enhancement effect through recovery of energy may be obtained in regenerative braking, a method which may more efficiently perform the regenerative braking may be desirable.

SUMMARY

The present disclosure provides a regenerative braking system which automatically generates a regenerative braking amount according to a relative distance or a relative velocity to a preceding vehicle during coasting driving of a vehicle and performs optimized regenerative braking in a situation in which deceleration is required through the generated regenerative braking amount to prevent unnecessary energy consumption and obtain an effect of additional fuel efficiency enhancement, and a method thereof.

An exemplary embodiment of the present disclosure provides a regenerative braking system using a reference deceleration during a vehicle coasting drive and a configuration of a method thereof which are configured to include: a preceding vehicle recognition module installed in a vehicle, and determining whether a preceding vehicle is present and measuring information on a relative distance and a relative velocity to the preceding vehicle; a vehicle sensor installed in the vehicle; and when the vehicle performs coasting driving in a state in which the preceding vehicle is sensed by the preceding vehicle recognition module, a control unit receiving information generated from the preceding vehicle recognition module and a sensor signal generated from the vehicle sensor and generating a reference deceleration to maintain a distance from the preceding vehicle within a safety distance and generating a driving torque command for outputting regenerative braking torque for following the generated reference deceleration and transferring the generated driving torque command to a vehicular driving system.

According to an exemplary embodiment of the present disclosure, in a regenerative braking system using a reference deceleration and a method thereof, there is an effect that driving convenience can be enhanced by maximizing APS and BPS input reduction effects in a following situation of a vehicle according to a relative distance and a relative velocity to a preceding vehicle during coasting driving of a vehicle.

Since a deceleration based on preceding vehicle information is performed regardless of intervention with a driver, driving stability of the vehicle may be improved.

A regenerative braking amount which meets various driving situations on a road is automatically generated and optimized regenerative braking is performed in a situation in which deceleration is required through the generated regenerative braking amount to obtain an effect of fuel efficiency enhancement.

DRAWINGS

DETAILED DESCRIPTION

Hereinafter, configurations and operations of a regenerative braking system using a reference deceleration during coasting driving of a vehicle and a method in one form of the present disclosure will be described in detail with reference to drawings.

However, disclosed drawings are provided as an example for allowing those skilled in the art to sufficiently appreciate the spirit of the present disclosure. Accordingly, the present disclosure is not limited to drawings presented below, but may be embodied in other aspects.

Unless otherwise defined, the terms used in the description of the present disclosure have the same meaning as commonly understood by those skilled in the art to which the present disclosure belongs and in the following description and the accompanying drawings, a detailed description of known functions and configurations that may unnecessarily blur the gist of the present disclosure is omitted.

Figure 1:
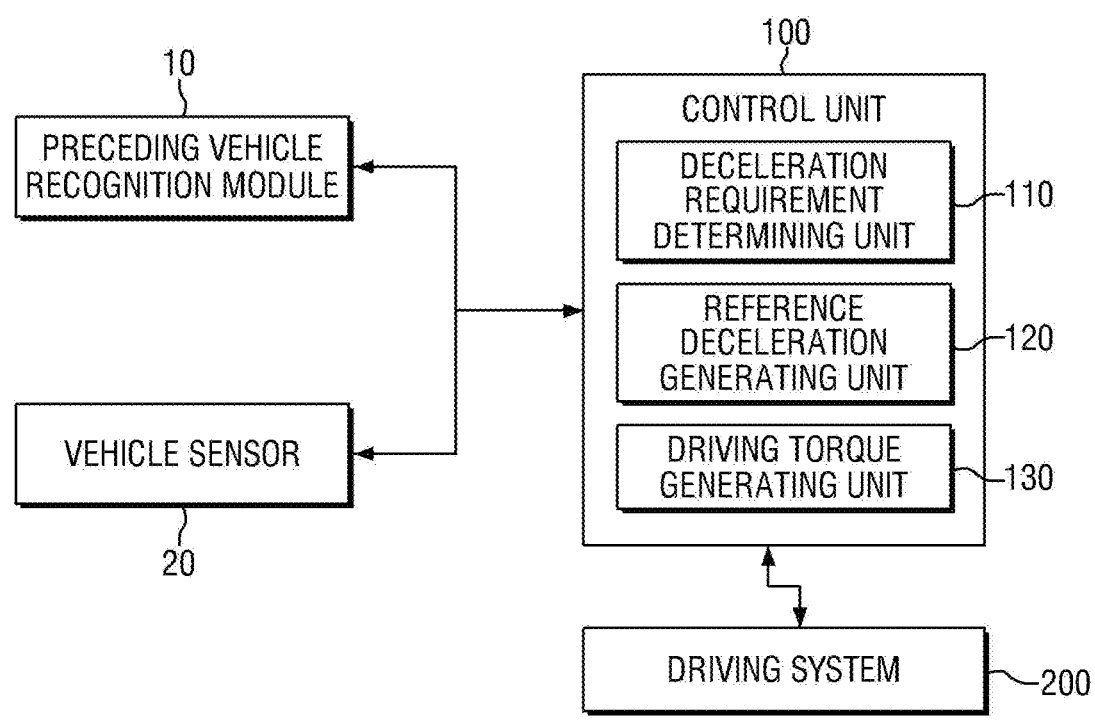
FIG. 1 is a block diagram of a regenerative braking system in one form of the present disclosure.

FIG. 1 is a block diagram of a regenerative braking system in some forms of the present disclosure.

In the regenerative braking system in some forms of the present disclosure, when a vehicle performs coasting driving in a state in which the preceding vehicle is sensed by the preceding vehicle recognition module by using a calculation model of a safety distance between its own vehicle (hereinafter, referred to as a 'user vehicle' for convenience of description) which is being driven, which is operated by a user and an another-person vehicle (hereinafter, referred to as a 'preceding vehicle' for convenience of description) being driven in front of the user vehicle, a reference deceleration is calculated and a regenerative braking amount is determined according to the calculated reference deceleration to allow the user vehicle to continuously maintain stability in driving even in a rapid acceleration of the preceding vehicle or in an incident situation in which the other vehicle suddenly gets stuck in front of the user vehicle and an actuation area of a regenerative system is escaped from a conventional limited vehicle velocity range to be extended to all vehicle velocity ranges.

Referring to FIG. 1, a regenerative braking system in some forms of the present disclosure is configured to include a preceding vehicle recognition module 10 installed in a vehicle, and determining whether a preceding vehicle is present and measuring information on a relative distance and a relative velocity to the preceding vehicle, such as a radar or a camera; a vehicle sensor 20 such as a vehicle velocity sensor, an accelerator pedal sensor (APS), a brake pedal sensor (BPS), or a longitudinal acceleration sensor mounted on a vehicle; and when the vehicle performs coasting driving in a state in which the preceding vehicle is sensed by the preceding vehicle recognition module 10, a control unit 100 receiving information generated from the preceding vehicle recognition module 10 and a sensor signal generated from the vehicle sensor 20 and generating a reference deceleration to maintain a distance from the preceding vehicle within a safety distance and generating a driving torque command for outputting regenerative braking torque for following the generated reference deceleration and transferring the generated driving torque command to a vehicular driving system 200.

A vehicular driving system 200 receiving the driving torque command is operated to apply regenerative braking torque to a motor of a vehicle according to the driving torque command, and as a result, regenerative braking is made in a vehicle being driven.

In this case, the control unit 100 may be actuated according to a control of an electronic control unit (ECU) of the vehicle or actuated independently from the control of the electronic control unit (ECU).

The vehicular driving system 200 is a part that receives the driving torque command generated by the control unit 100 to drive the motor of a hybrid electric vehicle or an electric vehicle.

The regenerative braking system in some forms of the present disclosure described above will be described in more detail.

The control unit 100 is configured to include a deceleration requirement determining unit 110 determining whether regenerative braking actuation is required according to a sensor signal input from the vehicle sensor 20 and when it is determined that the regenerative braking actuation is required, determining whether deceleration of the vehicle is required according to information of the preceding vehicle input from the preceding vehicle recognition module 10, a reference deceleration generating unit 120 generating, when it is determined by the deceleration requirement determining unit 10 that the deceleration of the vehicle is required, a reference deceleration depending on a driving situation of the vehicle by using the information of the preceding vehicle input from the preceding vehicle recognition module 10 and the sensor signal input from the vehicle sensor 20, and a driving torque amount generating unit 130 generating a driving torque command for outputting the regenerative braking torque following the generated reference deceleration and transferring the generated driving torque command to a driving system 200 of the vehicle.

Preferably, the deceleration requirement determining unit 110 determines whether the regenerative braking actuation is required according to an input value of an accelerator pedal sensor (APS) in the vehicle sensor 20 and receives information of a relative distance and a relative velocity between a user vehicle and the preceding vehicle from the preceding vehicle recognition module 10 to determine whether the deceleration of the vehicle is required.

Preferably, the reference deceleration generating unit 120 generates a reference deceleration depending on a driving situation of a current user vehicle according to the information of the relative distance and the relative velocity between the user vehicle and the preceding vehicle input fro the preceding vehicle recognition module 10 and velocities and acceleration sensor signals of the user vehicle and the preceding vehicle input from the vehicle sensor 20.

More preferably, in the generating of the reference deceleration, a reference deceleration a_ref is calculated by using a constant acceleration model acceleration value a_ca calculated by using a constant acceleration (abbreviated as 'CA') model based on the information of the relative distance and the relative velocity and the sensor signals of the velocity and the acceleration and a CTG policy model acceleration value a_ctg calculated by using a constant time gap (CTG) policy (abbreviated as 'CTG policy') model based on the information of the relative distance and the relative velocity and the sensor signals of the velocity and the acceleration.

Hereinafter, the constant acceleration model and the CTG policy model in some forms of the present disclosure will be described in more detail.

Figure 2:
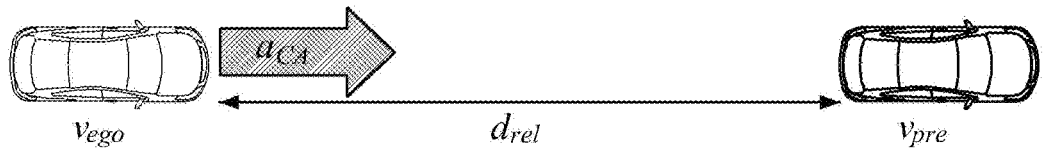
FIG. 2 is a conceptual diagram of a CA model used in the regenerative braking system in one form of the present disclosure.
Figure 3:
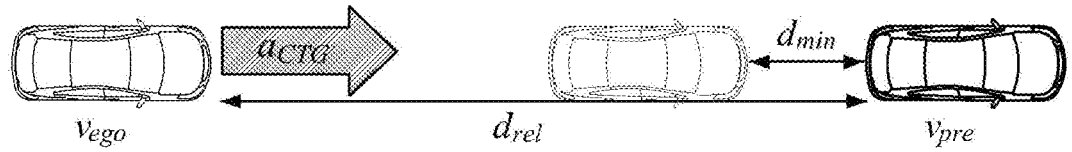
FIG. 3 is a conceptual diagram of a CTG policy model used in the regenerative braking system in one form of the present disclosure.

FIG. 2 is a conceptual diagram of a CA model used in the regenerative braking system in some forms of the present disclosure and FIG. 3 is a conceptual diagram of a CTG policy model used in the regenerative braking system in some forms of the present disclosure.

First, referring to FIG. 2, a configuration of calculating the constant acceleration model acceleration value a_ca by using the CA model in some forms of the present disclosure will be described.

The CA model in some forms of the present disclosure calculates the constant acceleration model acceleration value a_ca by using Equation 1 below based on a velocity v_ego of the user vehicle and a velocity v_pre of the preceding vehicle, and information on a distance d between the user vehicle and the preceding vehicle.

(Equation 1)

$$a_{CA} = \frac{v_{pre}^2 - v_{ego}^2}{2d} \quad (1)$$

*(1) represents Equation 1.

The constant acceleration model acceleration value a_ca may be calculated by using Equation 2 below and in Equation 2, different tendencies of a driver at a velocity of a preceding vehicle and a driver of a user vehicle are considered.

$$a_{CA} = \frac{\left((v_{pre} + v_{res})^2 - v_{ego}^2\right)}{2d} \quad \text{(Equation 2)}$$

* v_res : means a reserve velocity, and when this value is positive, this value means that the user vehicle is decelerated at a higher velocity than the preceding vehicle and when this value is negative, this value means that the user vehicle is decelerated at a lower velocity than the preceding vehicle.

Next, referring to FIG. 3, a configuration of calculating the CTG policy model acceleration value a_ctg calculated by using the constant time gap (CTG) policy (abbreviated as 'CTG policy') in some forms of the present disclosure will be described.

The CTG policy model in some forms of the present disclosure as a model for differently calculating a safety distance from the preceding vehicle according to the velocity of the user vehicle first sets a safety distance L_des so that Equation 3 below is in proportion to the velocity of the user vehicle based on the velocity v_ego of the user vehicle and the velocity v_pre of the preceding vehicle, and a distance d_rel between the user vehicle and the preceding vehicle and minimum distance d_min information between the user vehicle and the preceding vehicle.

(Equation 3)

$$L_{des} = hv_{ego} + d_{min} \quad (3)$$

h: Time Headway (3) represents Equation 3.

h of Equation 3 above as a value of a time vehicle head interval indicates a time until a vehicle head of a subsequent vehicle passes after the vehicle head of the preceding vehicle passes through a predetermined point in a vehicle which is continuously driven on the same traffic lane and as the value of h is larger, the safety distance is more significantly calculated at the same own vehicle velocity.

Next, when the safety distance L_des is set so as to be proportional to the velocity of the user vehicle by Equation 3 above, the CTG policy model acceleration value a_ctg to maintain the safety distance from the user vehicle and the preceding vehicle is calculated by sequentially calculating respective equations of Equations 4 to 8 below.

(Equation 4)

$$\delta = L_{des} - d_{rel} \quad (4)$$

* δ: spacing error value

* (4) represents Equation 4.

(Equation 5)

$$\delta = hv_{ego} + d_{min} - d_{rel} \quad (5)$$

* (5) represents Equation 5.

(Equation 6)

$$\delta = hv_{ego} + \varepsilon \quad (6)$$

* ε: d_min(−)d_rel

* (6) represents Equation 6.

(Equation 7)

$$a_{CTG} = -\frac{1}{h}(\dot{\varepsilon} + \lambda \delta) \quad (7)$$

* a_ctg: CTG policy model acceleration value

* λ: tuning parameter (as the value of λ is larger, the relative distance converges to the safety distance faster)

* (7) represents Equation 7.

(Equation 8)

$$a_{CTG} = -\frac{1}{h}(v_{rel} + \lambda \delta) \quad (8)$$

* a_ctg: CTG policy model acceleration

* v_rel: Relative velocities of user vehicle and preceding vehicle

* (8) represents Equation 8.

Next, by using both the constant acceleration model acceleration value a_ca calculated by Equation 1 or 2 above and the CTG policy model acceleration value a_ctg calculated by Equation 7 or 8 above, the reference deceleration a_ref is calculated by Equations 9 and 10 below.

(Equation 9)

$$a_{ref} = w_{CA}a_{CA} + w_{CTG}a_{CTG} \quad (9)$$

w_ca: Weight of constant acceleration model acceleration value a_ca w_ctg: Weight of CTG policy model acceleration value a_ctg The weight w_ca of the constant acceleration model acceleration value a_ca and the weight w_ctg of the CTG policy model acceleration value a_ctg may be controlled according to various variables (e.g., velocity of own vehicle, relative distance, time headway from the preceding vehicle, etc.) capable of expressing a vehicle following situation.

(9) represents Equation 9.

(Equation 10)

$$w_{CTG} = 1 - w_{CA} \quad (10)$$

(10) represents Equation 10.

For reference, referring to Exemplary embodiments 1 to 4 below, an application example of the weight w_ca of the constant acceleration model acceleration value a_ca and the weight w_ctg of the CTG policy model acceleration value a_ctg will be described variously.

Exemplary Embodiment 1

When the relative distance of the user vehicle and the preceding vehicle is 30 m or more, only the constant acceleration model is used, when the relative distance is an interval between 30 m and 10 m, the constant acceleration model and the CTG policy are mixedly used, and when the relative distance is 10 m or less, only the CTG model is used:

$$w_{CA} = \begin{cases} 1 \, (d_{rel} > 30 \text{ m}) \\ \dfrac{(d_{rel} - 10)}{20} \, (30 \text{ m} \geq d_{rel} > 10 \text{ m}) \\ 0 \, (d_{rel} \leq 10 \text{ m}) \end{cases}$$

$$w_{CTG} = 1 - w_{CA}$$

Exemplary Embodiment 2

When a remaining time until the user vehicle and the preceding vehicle collide with each other is 1.6 s or more, only the constant acceleration model is used, when the remaining time is an interval between 1.6 s and 1.2 s, the constant acceleration model and the CTG policy are mixedly used, and when the remaining time is 1.2 s or less, only the CTG model is used:

$$w_{CA} = \begin{cases} 1 \, (h > 1.6 \text{ s}) \\ \dfrac{(h - 1.2)^3}{0.4^3} \, (1.6 \text{ s} \geq h > 1.2 \text{ s}) \\ 0 \, (h \leq 1.2 \text{ s}) \end{cases}$$

$$w_{CTG} = 1 - w_{CA}$$

Exemplary Embodiment 3

When the velocity of the user vehicle is 20 m/s or more, only the constant acceleration model is used, when the velocity of the user vehicle is an interval between 20 m/s and 10 m/s, the constant acceleration model and the CTG policy are mixedly used, and when the velocity of the user vehicle is 10 m/s or less, only the CTG model is used:

$$w_{CA} = \begin{cases} 1 \, (v_{ego} > 20 \text{ m/s}) \\ \dfrac{(v_{ego} - 10)^2}{20} \, (20 \text{ m/s} \geq v_{ego} > 10 \text{ m/s}) \\ 0 \, (v_{ego} \leq 10 \text{ m/s}) \end{cases}$$

$$w_{CTG} = 1 - w_{CA}$$

Exemplary Embodiment 4

When the velocity of the preceding vehicle is 20 m/s or more, only the constant acceleration model is used, when the velocity of the preceding vehicle is the interval between 20 m/s and 10 m/s, the constant acceleration model and the CTG policy are mixedly used, and when the velocity of the preceding vehicle is 10 m/s or less, only the CTG model is used:

$$w_{CA} = \begin{cases} 1 \, (v_{pre} > 20 \text{ m/s}) \\ \dfrac{(v_{pre} - 10)^2}{20} \, (20 \text{ m/s} \geq v_{pre} > 10 \text{ m/s}) \\ 0 \, (v_{pre} \leq 10 \text{ m/s}) \end{cases}$$

$$w_{CTG} = 1 - w_{CA}$$

Figure 4:
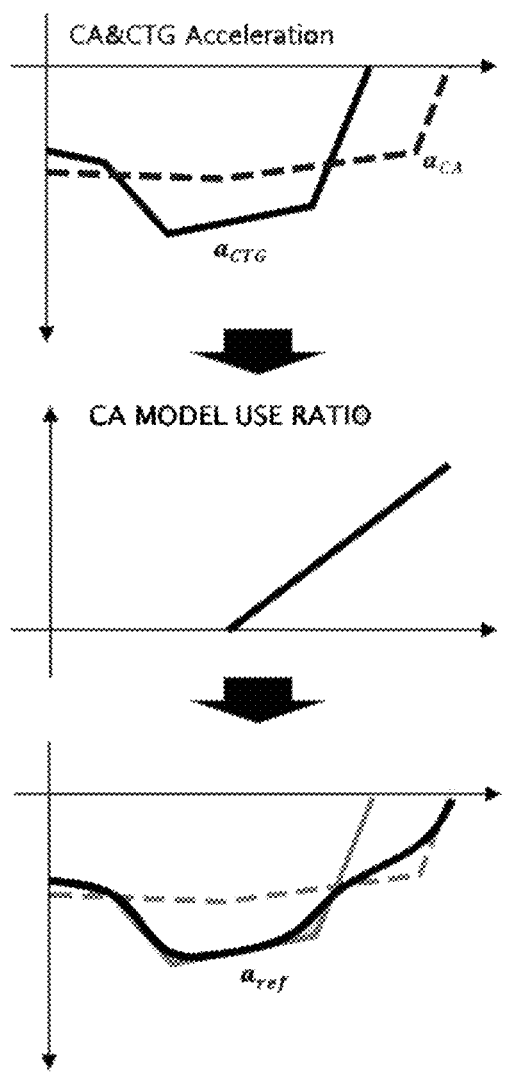
FIG. 4 is a graph illustrating an acceleration of the CA model, the acceleration of the CTG policy model, a use ratio of the CA model, and an aggregate of the acceleration of the CA model and the acceleration of the CTG policy model used the regenerative braking system in one form of the present disclosure.

FIG. 4 is a graph illustrating an acceleration of the CA model, the acceleration of the CTG policy model, a use ratio of the CA model, and an aggregate of the acceleration of the CA model and the acceleration of the CTG policy model in the regenerative braking system in some forms of the present disclosure.

Referring to FIG. 4, in a graph of an example of CA & CTG Acceleration on the top of FIG. 4, according to an example of a use ratio of the CA model in some forms of the present disclosure on the middle of FIG. 4, when the reference deceleration a_ref is calculated by Equations 9 and 10 above by using both the constant acceleration model acceleration value a_ca and the CTG policy model acceleration value a_ctg, the graph of the calculated reference deceleration a_ref is shown like the bottom of FIG. 4.

Next, a regenerative braking method in some forms of the present disclosure will be described with reference to FIG. 5.

Figure 5:
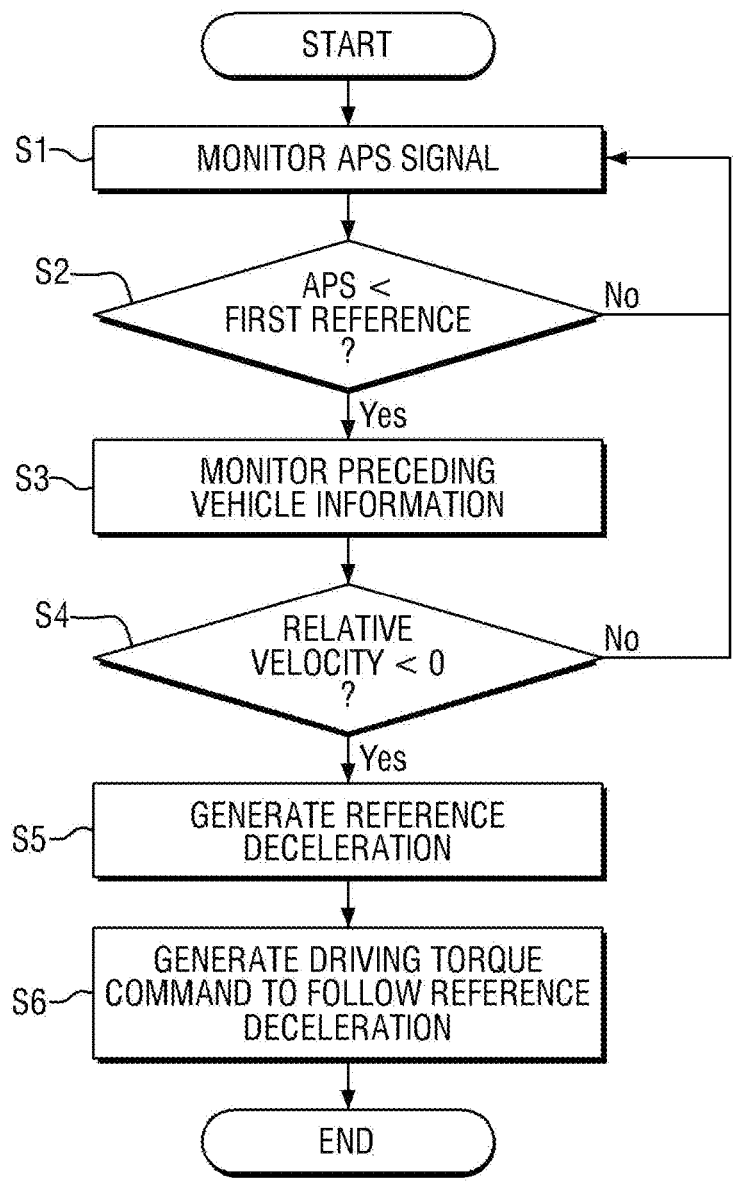
FIG. 5 is a flowchart of a regenerative braking method in one form of the present disclosure.

Referring to FIG. 5, the regenerative braking method in some forms of the present disclosure is a regenerative braking method performed by the preceding recognition module 10, the vehicle sensor 20, and the control unit 100 described above and specifically, each step will be described below.

First, the control unit 100 monitors a signal input from an accelerator pedal sensor (APS) of the vehicle sensor 20 (S1).

Next, during the monitoring process, the control unit 100 determines whether a value of a sensor signal of an accelerator pedal sensor is less than a predetermined first reference value to determine whether a user vehicle is being accelerated by stepping on an accelerator pedal (S2).

The first reference value may be changed according to sensor characteristics of the accelerator pedal sensor, when the APS value is less than the first reference value, the accelerator pedal of the user vehicle is not stepped and it is determined that the user vehicle is in a state of coasting driving and when the APS value is more than the first reference, the accelerator pedal of the user vehicle is stepped and it is determined that the user vehicle is in a state of acceleration driving.

Next, according to the determination result, in step S2 above, when the APS value is less than the first reference value and the user vehicle is in the state of the coasting driving, the control unit 100 monitors information of the preceding vehicle input from the preceding vehicle recognition module 10 (S3).

On the contrary, according to the determination result in step S2 above, when the APS value is equal to or more than the first reference value, the monitoring in step S1 above is continuously performed.

The control unit 100 determines whether the relative speed between the user vehicle and the preceding vehicle is less than 0 during the monitoring process in step S3 above (S4) to determine whether deceleration of the driven user vehicle is required.

Here, when the value of the relative velocity between the user vehicle and the preceding vehicle is less than 0 as a case where the velocity of a current user vehicle is higher than the velocity of the preceding vehicle, the case indicates a state in which deceleration by regenerative braking is required so as to maintain the distance form the preceding vehicle within the safety distance.

However, when the value of the relative velocity is 0 or more as a case where the velocity of the current user vehicle is lower than the velocity of the preceding vehicle, the case indicates that the deceleration by the regenerative braking is not required.

According to the determination result in step S4 above, in a situation in which the user vehicle being driven is required to be decelerated, the control unit 100 generates a reference deceleration to maintain the distance from the preceding vehicle within the safety distance by using information of the preceding vehicle input from the preceding vehicle recognition module 10 and a sensor signal input from the vehicle sensor 20 (S5) and the control unit 100 generates a driving torque command for outputting regenerative braking torque for following the generated reference deceleration and transfers the generated driving torque command to the vehicular driving system 200, and a vehicular driving system 200 receiving the driving torque command is operated (S6) to apply regenerative braking torque to a motor of a vehicle according to the driving torque command, and as a result, regenerative braking is made in a vehicle being driven.

Accordingly, according to the regenerative braking method in some forms of the present disclosure described above, regenerative braking is automatically made by considering the distance from the preceding vehicle and the velocity during the coasting driving of the vehicle to enhance the stability of the vehicle being driven and enhance fuel efficiency by the regenerative braking actuation and inputs of the accelerator pedal and the brake pedal are minimized in a following situation with the preceding vehicle to obtain an effect that the driver may perform driving more conveniently.

What is claimed is:

1. A regenerative braking system of a vehicle, comprising:
   a preceding vehicle recognition module installed in a vehicle, the preceding vehicle recognition module configured to determine whether a preceding vehicle is present and measure information on a relative distance and a relative velocity to the preceding vehicle;
   a vehicle sensor installed in the vehicle; and
   a controller configured to:
      receive information generated from the preceding vehicle recognition module and a sensor signal generated form the vehicle sensor;
      generate a reference deceleration (a_ref) to maintain a distance from the preceding vehicle within a safety distance, wherein the reference deceleration (a_ref) is generated based on a constant acceleration model acceleration value (a_ca);
      generate a driving torque command for outputting regenerative braking torque for following the generated reference deceleration; and
      transfer the generated driving torque command to a vehicular driving system;
   wherein the vehicular driving system is configured to receive the driving torque command and to apply regenerative braking torque to a motor of a vehicle according to the driving torque command;
   wherein the controller further comprises,
      a deceleration requirement determining unit configured to:
         determine whether regenerative braking actuation is required according to a sensor signal input from the vehicle sensor; and
         when it is determined that the regenerative braking actuation is required, determine whether deceleration of the vehicle is required according to information of the preceding vehicle input from the preceding vehicle recognition module;
      a reference deceleration generating unit configured to:
         when it is determined that the deceleration of the vehicle is required, generate the reference deceleration (a_ref) depending on a driving situation of the vehicle by using the information of the preceding vehicle input from the preceding vehicle recognition module and the sensor signal input from the vehicle sensor; and
      a driving torque amount generating unit configured to:
         generate a driving torque command to allow the vehicle to follow the reference deceleration (a_ref) generated by the reference deceleration generating unit; and
         transfer the generated driving torque command to the vehicular driving system;
   wherein the reference deceleration generating unit is further configured to:
      generate the reference deceleration (a_ref) depending on a driving situation of the user vehicle according to the information of the relative distance and the relative velocity between the user vehicle and the preceding vehicle, and velocities and acceleration sensor signals of the user vehicle and the preceding vehicle, respectively; and
      calculate the constant acceleration model acceleration value (a_ca) by using a constant acceleration (CA) model based on the information of the relative distance and the relative speed, and the sensor signals of the speed and the acceleration; and
      calculate a CTG policy model acceleration value (a_ctg) by using a constant time gap (CTG) policy model based on the information of the relative distance and the relative speed, and the sensor signals of the speed and the acceleration.

2. The regenerative braking system of claim 1, wherein the deceleration requirement determining unit is configured to:
   determine whether the regenerative braking actuation is required according to an input value of an accelerator pedal sensor (ASP) in the vehicle sensor; and
   receive, from the preceding vehicle recognition module, information of a relative distance and a relative velocity between a user vehicle and the preceding vehicle to determine whether the deceleration of the vehicle is required.

3. The regenerative braking system of claim 1, wherein the reference deceleration generation unit is configured to:
   calculate the constant acceleration model acceleration value (a_ca) by using Equation 1

(Equation 1)
$$a_{CA} = \frac{v_{pre}^2 - v_{ego}^2}{2d}, \quad (1)$$

wherein v_ego is a velocity of the user vehicle, v_pre is a velocity of the preceding vehicle, and d is information on a distance between the user vehicle and the preceding vehicle.

4. The regenerative braking system of claim 1, wherein the reference deceleration generation unit is configured to:
   calculate the CTG policy model acceleration value (a_ctg) by Equation 7

(Equation 7)
$$a_{CTG} = -\frac{1}{h}(\dot{\varepsilon} + \lambda\delta), \quad (7)$$

wherein λ is a tuning parameter and when the value of λ is larger, the relative distance converges to the safety distance faster.

5. The regenerative braking system of claim 1, wherein the reference deceleration generation unit is configured to: calculate the CTG policy model acceleration value (a_ctg) by Equation 8, (Equation 8)

$$a_{CTG} = -\frac{1}{h}(v_{rel} + \lambda\delta),\quad(8)$$

wherein v_rel is relative velocities of user vehicle and preceding vehicle.

6. The regenerative braking system of claim 1, wherein the reference deceleration generation unit is configured to: calculate the reference deceleration (a_ref) by Equations 9 and 10

(Equation 9)

$$a_{ref} = w_{CA}a_{CA} + w_{CTG}a_{CTG} \quad(9)$$

wherein w_ca is weight of the constant acceleration model acceleration value (a_ca), and w_ctg is weight of the CTG policy model acceleration value (a_ctg)

(Equation 10)

$$w_{CTG} = 1 - w_{CA} \quad(10).$$

7. A regenerative braking method performed by a preceding vehicle recognition module, a vehicle sensor, and a controller installed in a vehicle, comprising:
monitoring, by the controller, a signal input from an accelerator pedal sensor (APS) of the vehicle sensor;
when the signal is monitored, determining, by the controller, whether a value of a sensor signal of the APS is less than a predetermined first reference value to determine whether a user vehicle is being accelerated by stepping on an accelerator pedal;
when it is determined that the value of the sensor signal of the APS is less than the first reference value and the user vehicle is in a coasting driving, monitoring, by the controller, information of the preceding vehicle input from the preceding vehicle recognition module;
determining whether the relative speed between the user vehicle and the preceding vehicle is less than 0 to determine whether deceleration of the user vehicle is required;
when it is determined that the deceleration of the user vehicle is required, generating, by the controller, a reference deceleration (a_ref) to maintain a distance from the preceding vehicle within a safety distance by using information of the preceding vehicle input from the preceding vehicle recognition module and a sensor signal input from the vehicle sensor, wherein the reference deceleration (a_ref) is generated based on a constant acceleration model acceleration value (a_ca);
generating, by the controller, a driving torque command for outputting regenerative braking torque for following the generated reference deceleration; and
transferring the generated driving torque command to a vehicular driving system, wherein the vehicle driving system is configured to receive the driving torque command and to apply regenerative braking torque to a motor of a vehicle according to the driving torque command:
wherein generating the reference deceleration (a_ref) includes:
generating the reference deceleration (a_ref) depending on a driving situation of the user vehicle according to the information of the relative distance and the relative velocity between the user vehicle and the preceding vehicle, and velocities and acceleration sensor signals of the user vehicle and the preceding vehicle, respectively;
calculating the constant acceleration model acceleration value (a_ca) by using a constant acceleration (CA) model based on the information of the relative distance and the relative speed, and the sensor signals of the speed and the acceleration; and
calculating a CTG policy model acceleration value (a_ctg) by using a constant time gap (CTG) policy model based on the information of the relative distance and the relative speed, and the sensor signals of the speed and the acceleration.

* * * * *